(12) United States Patent
Petrucci et al.

(10) Patent No.: US 9,008,853 B2
(45) Date of Patent: Apr. 14, 2015

(54) VEHICLE OPERATOR IDENTIFICATION AND OPERATOR-CONFIGURED SERVICES

(75) Inventors: David R. Petrucci, Warren, MI (US);
Charles A. Massoll, Milford, MI (US);
Thiep T. Nguyen, Macomb, MI (US);
Mark A. Wisnewski, Stockbridge, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 13/313,618

(22) Filed: Dec. 7, 2011

(65) Prior Publication Data

US 2013/0151027 A1 Jun. 13, 2013

(51) Int. Cl.
*B60R 16/037* (2006.01)

(52) U.S. Cl.
CPC .................................. *B60R 16/037* (2013.01)

(58) Field of Classification Search
CPC ........................................................ B60R 16/037
USPC ..................................... 701/1, 36; 340/425.5
See application file for complete search history.

(56) References Cited

U.S. PATENT DOCUMENTS

| | | | |
|---|---|---|---|
| 6,008,723 A * | 12/1999 | Yassan | 340/438 |
| 6,526,335 B1 * | 2/2003 | Treyz et al. | 701/1 |
| 8,340,898 B2 * | 12/2012 | Currie et al. | 701/409 |
| 2009/0284359 A1 * | 11/2009 | Huang et al. | 340/426.1 |
| 2010/0030434 A1 * | 2/2010 | Okabe et al. | 701/48 |
| 2012/0296492 A1 * | 11/2012 | Gusikhin et al. | 701/1 |

* cited by examiner

*Primary Examiner* — John Q Nguyen
*Assistant Examiner* — Alan D Hutchinson
(74) *Attorney, Agent, or Firm* — Cantor Colburn LLP

(57) ABSTRACT

A system for implementing customized vehicle services includes a vehicle control system including a computer processor, and logic executable by the computer processor, the logic configured to implement a method. The method includes receiving user-selected settings for distributing a communication, the user-selected settings input to the computer processor by a user of a vehicle. The method also includes monitoring vehicle components for a condition specified in the user-selected settings, and distributing the communication pursuant to the user-selected settings when the condition is met in response to the monitoring.

20 Claims, 6 Drawing Sheets

VEHICLE OPERATOR IDENTIFICATION AND OPERATOR-CONFIGURED SERVICES

FIELD OF THE INVENTION

The subject invention relates to communications and, more particularly, to vehicle operator identification and operator-configured services.

BACKGROUND

Many vehicles today come equipped with components that enable communication between the vehicle and external sources. For example, roadside assistance services enable a vehicle's telematics system to contact a service provider for engaging emergency services in the event of an accident or emergency situation. In addition, some vehicles offer onboard cellular communications facilitated by a user's cellular telephone service. However, there is typically no ability to provide pre-configured, customized communications through a vehicle to external sources or operators of the vehicle.

In addition, while advances in technology have yielded improvements to vehicle electronics and control systems, there is currently no way to identify a current operator who is in a vehicle. The ability to determine this information could provide vehicle manufacturers the ability to offer advanced services tailored to the specific needs or interests of vehicle owners and operators.

Accordingly, it is desirable to provide a way to identify an operator of a vehicle to provide customized and directed services through the vehicle.

SUMMARY OF THE INVENTION

In one exemplary embodiment of the invention a system for implementing customized vehicle services is provided. The system includes a vehicle control system including a computer processor, and logic executable by the computer processor. The logic is configured to implement a method. The method includes receiving user-selected settings for distributing a communication, the user-selected settings input to the computer processor by a user of a vehicle. The method also includes monitoring vehicle components for a condition specified in the user-selected settings, and distributing the communication pursuant to the user-selected settings when the condition is met in response to the monitoring.

In another exemplary embodiment of the invention, a method for implementing customized vehicle services is provided. The method includes receiving user-selected settings for distributing a communication, the user-selected settings input to a computer processor of a vehicle control system by a user of a vehicle. The method also includes monitoring vehicle components for a condition specified in the user-selected settings, and distributing the communication pursuant to the user-selected settings when the condition is met in response to the monitoring.

In yet another exemplary embodiment of the invention a computer program product for implementing customized vehicle services is provided. The computer program product includes a storage medium having computer program instructions embodied thereon, which when executed by a computer processor, cause the computer processor to implement a method. The method includes receiving user-selected settings for distributing a communication, the user-selected settings input to the computer processor by a user of a vehicle. The method also includes monitoring vehicle components for a condition specified in the user-selected settings, and distributing the communication pursuant to the user-selected settings when the condition is met in response to the monitoring.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
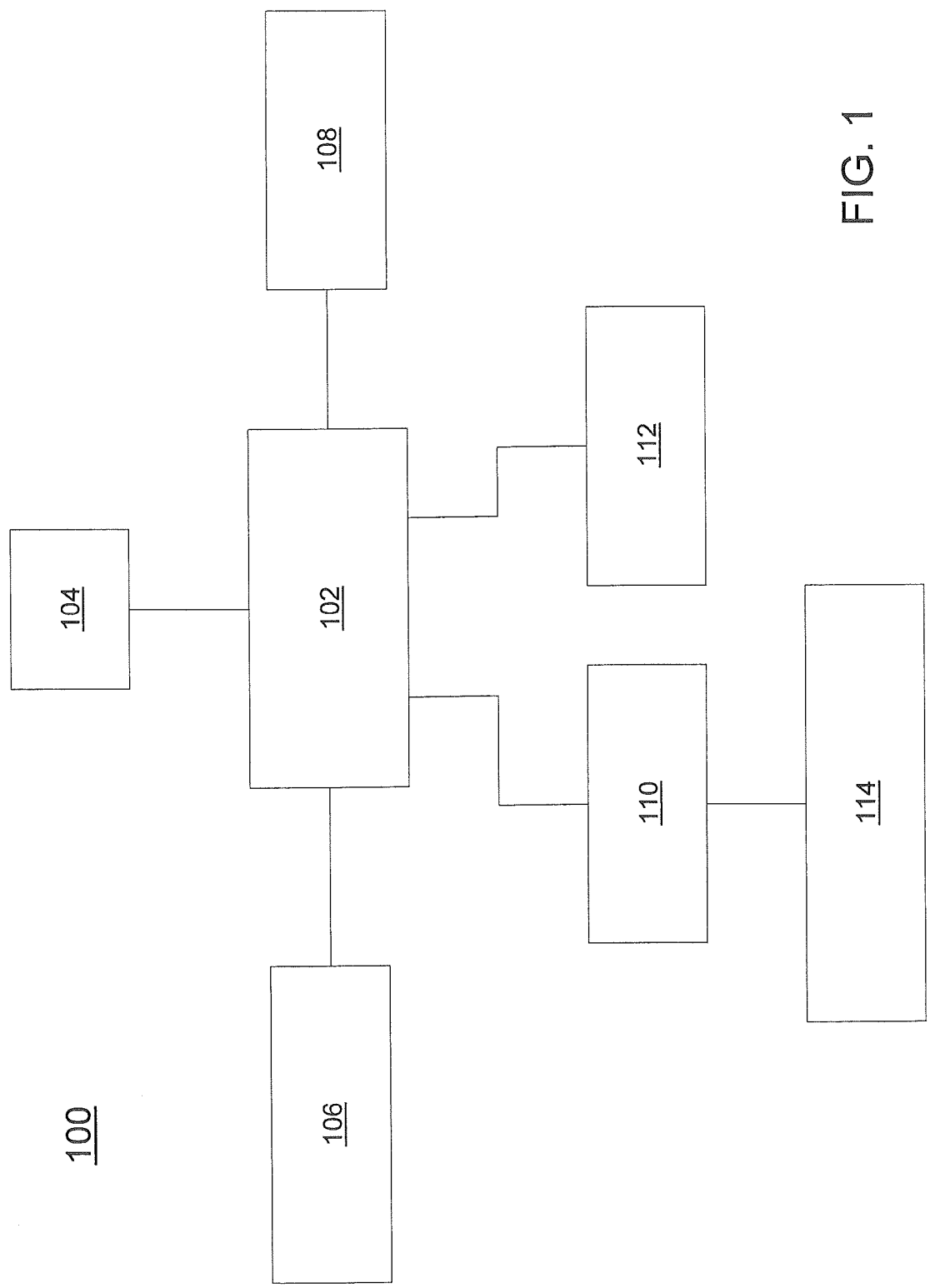
FIG. 1 is a block diagram of a system upon which customized vehicle services may be implemented in accordance with an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention customized vehicle services are provided. The customized vehicle services provide the ability to identify a particular operator of a vehicle and to initiate directed and customized services through the vehicle. In one embodiment, the customized vehicle services enable recorded voice data and text-based messages or communications to be directed to individuals within a vehicle or to external sources based on user settings and monitored vehicle conditions and data. The messages or communications include user-configured instructions or information that is directed to another operator of the vehicle. The messages also include service or maintenance reminders to an operator of the vehicle. The messages further include alerts that are generated to targeted destinations based on emergency conditions. These and other features of the customized vehicle services are described herein.

Turning now to FIG. 1, a system 100 upon which customized vehicle services may be implemented will now be described in an exemplary embodiment. The system 100 represents a portion of a vehicle including components used in performing the customized vehicle communications. The vehicle may be any type of automobile known in the art. As shown in FIG. 1, the system 100 includes a control system 102 that is communicatively coupled to a memory 106, input/output (I/O) components 108, and communications components 112. The control system 102 may be coupled to the memory 106, I/O components 108, and communications components 112 via physical wiring, a vehicle network (e.g., a local area network), or a combination thereof. The control system 102 performs various functions commonly understood by those skilled in the art of vehicle electronics.

The control system 102 includes a computer processor that executes logic 104 for providing the customized vehicle services described herein. The memory 106 may be implemented as a storage device (e.g., hard disk drive) that stores files and data produced via the control system 102, logic 104, and I/O components 108.

The I/O components 108 may be integrated into a dashboard or infotainment system of the vehicle. The input components of the I/O components 108 may include controls (e.g., keypad or touchscreen) or may be implemented by voice recognition technology and voice commands. The output components of the I/O components 108 may include a display screen or monitor, or may be an audio system that presents audio messages or alerts to occupants of the vehicle. The logic 104 is configured to receive inputs via the I/O components 108 in assisting a user to establish account settings (see, for example, FIG. 2) and to process the inputs to create a file for the operator, as will be described further herein. The file may be stored in the memory 106 and accessed by the logic 104 as needed.

In an embodiment, the control system 102 is also communicatively coupled to one or more vehicle components 114 which provide vehicle data 110 to the control system 102. The vehicle components 114 may include any elements for which data collection, and/or operational control, is desired (e.g., a fuel or other fluids gauges, a temperature gauge, an air bag system, roll-over sensors, a speedometer, an odometer, seat position controls, a digital radio or infotainment system, an ignition system, a clock, a key fob, head and tail lights, a horn, a global positioning system (GPS), a heating, ventilation, and air conditioning (HVAC) system, etc.). The vehicle data 110 collected may include engine temperature, fluid levels, air bag deployment state, vehicle roll over state, vehicle speed, seat position data, selected radio station, power state, data encoded on a key fob, head and tail light operating state, GPS location, HVAC operational state, etc. The vehicle components 114 are monitored by the control system 102, as described further herein.

The communications components 112 send and receive communications through the control system 102 of the vehicle. The communications components 112 may include one or more of a navigation system, a roadside assistance system (e.g., OnStar™), a cellular communications system, and a short-range communications system (e.g., one that utilizes wireless transmission protocols, such as BlueTooth™).

In an embodiment, a vehicle owner or operator (referred to herein as "operator") may configure customized vehicle services' settings through a user interface provided by the logic 104. The logic 104 is configured to enable the operator to identify himself to the control system 102 using, e.g., key fob identification information provided by a key fob when engaged in the vehicle ignition system. Alternatively, the operator may identify himself through a user-selected personal identification number created by the operator and entered via the user interface logic 104 and I/O components 108. In yet a further embodiment, the operator may identify himself to the control system 102 via a cell phone communication between the operator's cell phone and the communications components 112 (e.g., through a short-range communications antenna). The operator may be identified by the cell phone number assigned to the cell phone.

In a further alternative embodiment, the logic 104 may be configured to monitor the vehicle data 110 over time and identify the operator using the vehicle data 110. For example, the logic 104 may be configured to process current seat position settings, current radio station selected, key fob data, or other data that suggest a particular operator is behind the wheel of the vehicle. By monitoring this vehicle data 110 over time, the logic 104 identifies patterns associated with an operator and may identify the operator from this data or patterns observed therefrom.

The logic 104 assigns a unique identifier to the operator and stores this information in a file in the memory 106 in order to distinguish the operator from other potential operators of the vehicle.

In an embodiment, once identified, the operator may enter emergency contact (ICE) information, vehicle service alert criteria, messages, and other information settings via the user interface of the logic 104, which stores this information in the file. The logic 104 may be configured to identify vehicle operators of a vehicle, and generate or retrieve and present messages or communications associated with a particular operator identification. The logic 104 may also be configured to monitor vehicle conditions or events, and execute an action or alert based on specified conditions. These and other features of the customized vehicle services will now be described.

Figure 2:
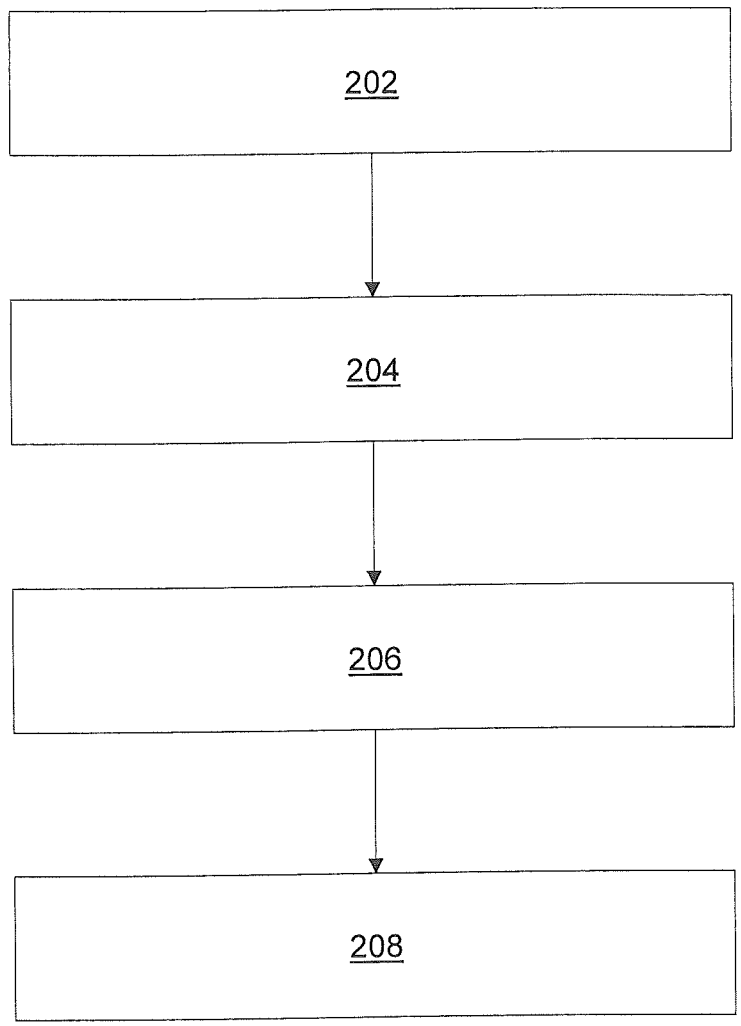
FIG. 2 is a flow diagram describing a process for establishing account settings for use in implementing customized vehicle services in accordance with an embodiment.

Turning now to FIG. 2, a process for establishing settings for use in implementing the customized vehicle services will now be described in an embodiment. At step 202, a vehicle operator enters settings via the user interface and I/O components 108. The settings may utilize parameters that are operator ID based, time based, and/or event based. Operator ID-based settings enable a user to define or create a communication directed to a particular operator of the vehicle. Time-based settings enable a user to create a communication that is presented to an operator at or near a specified time. An event-based setting enables the user to define conditions upon which a communication will be presented or transmitted. Other parameters may be utilized in realizing the advantages of the invention. The parameters described herein are provided for illustrative purposes and are not to be construed as limiting in scope.

As indicated above, the settings for a particular communication may include establishing an operator identifier by creating a personal information number (PIN) or code, entering the text (or voice recording) of the communication and associated target of the communication (e.g., using other operator identifiers). Other settings may be configured for handling emergency conditions by entering emergency contact information for establishing alerts. Other settings include the ability to establish communications that are instructional or informational and may be targeted to a particular operator (e.g., a teen driver) or to all potential occupants of the vehicle. For example, a communication may instruct the operator to refuel at a particular location, or ensure that the vehicle is returned home by a specified time. A sample file format containing communication information (operator ID based) is shown below (where "MSG" specifies the communication identification, and "IDxx" specifies the operator identification):

MSG1 to ID02/from ID03
MSG2 to ID01/from ID02
MSG3 to ID02/from ID03

As indicated above, the account settings enable a user to configure communications that are event based. An alert may be defined by the user to identify individuals or facilities and contact information for the individuals or facilities to which an alert will be transmitted in the event of an emergency. The nature of the emergency may also be defined by the user as a triggering condition for the alert. For example, an emergency can be defined as an accident (vehicle or other type), the detection of a serious health issue (e.g., the initial signs of stroke or heart attack), an intrusion or attempted intrusion of the vehicle by another (e.g., attempted hijacking or abduction), etc. Historical information gathered for the operator over time, in conjunction with the account settings, may be processed and compared with current conditions to determine an emergency condition. These features are described further herein. The alerts may also include supplemental information, such as preferred hospital, medication allergies of operator and/or passengers, medical conditions of operator and/or passengers, or similar types of information. A sample file format containing alert information is shown below:

ID01 Allergy to codeine, diabetic, contact 1-800-123-4567, contact spouse 555-123-4567.

In addition, the logic 104 may be configured to monitor the vehicle components 114 for other events that may signify an emergency condition, such as a vehicle roll-over, air-bag deployment, or other data. The logic 104 accesses the file in memory 106 to retrieve alert settings entered by the operator and notifies the appropriate individuals or entities.

In addition to providing alerts in an emergency situation, the logic 104 may be configured to perform other defined actions. The customized vehicle services may be adapted to identify patterns of behavior of a particular operator and ascertain when a particular pattern of behavior reflects that the operator has deviated from the norm (e.g., the GPS data indicates the operator has deviated from what is determined by the logic 104 to be a routine route of travel, or vehicle components 114 reflect that the operator is swaying within or across lanes or inconsistently accelerating and decelerating). In this event, the logic 104 may be configured to present a query to the operator to establish whether the deviation is the result of an inert anomaly or is the product of a potential emergency condition. By knowing the identity of the current operator, as well as the operator's health conditions (e.g., the account settings indicate medications that reflect a serious health condition), the logic 104 may be configured to take specific actions when the operator fails to acknowledge the query within a specified time. If the query fails to produce a desired outcome, the logic 104 may be configured to take further action, such as contact authorities, activate vehicle components 114 to engage in attention-seeking activities (e.g., flash head and tail lights, activate horn or vehicle alarm system). These features are described further in FIG. 3.

In addition, the logic 104 may be configured for applications as shown below:
APP_ID_X_DATA 1D_ID01
APP_ID_Y_DATA 1D_ID02
APP_ID_Y_DATA 2D_ID02

The logic 104 may be configured to list applications (e.g., APP_ID_X) along with its data (e.g., DATA_1D) associated with specific operator (e.g., ID01) when it needs to be synchronized with mobile devices. These off-board applications provide an additional user interface for users to configure and synchronize internal communications with the vehicle from a mobile device to expand the overall flexibility of voice messaging to other existing applications on the mobile device. For example, an oil change reminder (i.e., a vehicle service alert) pop-up may be implemented on a mobile device after it synchronizes with the vehicle, and the user may then add the alert into a personal calendar on the device.

In an embodiment, the logic 104 may be configured to monitor vehicle components 114 and provide service-type instructions, suggestions, or reminders to an operator of the vehicle in response to some pre-determined threshold value. These communications may be configured as event-based communications directed to any operator of the vehicle or to a particular operator (e.g., a combined operator ID-based and event-based communication). For example, the oil gauge may be monitored and the logic 104 may notify the operator (e.g., via the I/O components 108 or by other means, such as cellular communication to the operator's cell phone) to change the oil in the vehicle when a threshold level of oil is determined. A sample file containing service information is shown below:

ID_SERV_DATA 1.X
CONTACT
ID_SERV_DATA 2.X
CONTACT

When service is needed, as determined via the logic 104, the file is accessed and an appropriate service communication is generated and transmitted to the contact provided in the file. In addition, the operator may establish settings that include providing contact information for a preferred repair shop or service facility. When the configured "event" is triggered (oil change needed), the logic 104 may be configured to contact the service facility and request an appointment, providing the service facility with the operator's contact information and type of service needed. The service facility may then call or contact the operator to schedule the service.

Returning now to FIG. 2, at step 204 the logic 104 assigns an identifier to the operator and maps the identifier to the information entered by the operator at step 206. At step 208, the information and identifier are stored in the file as account settings.

Figure 3:
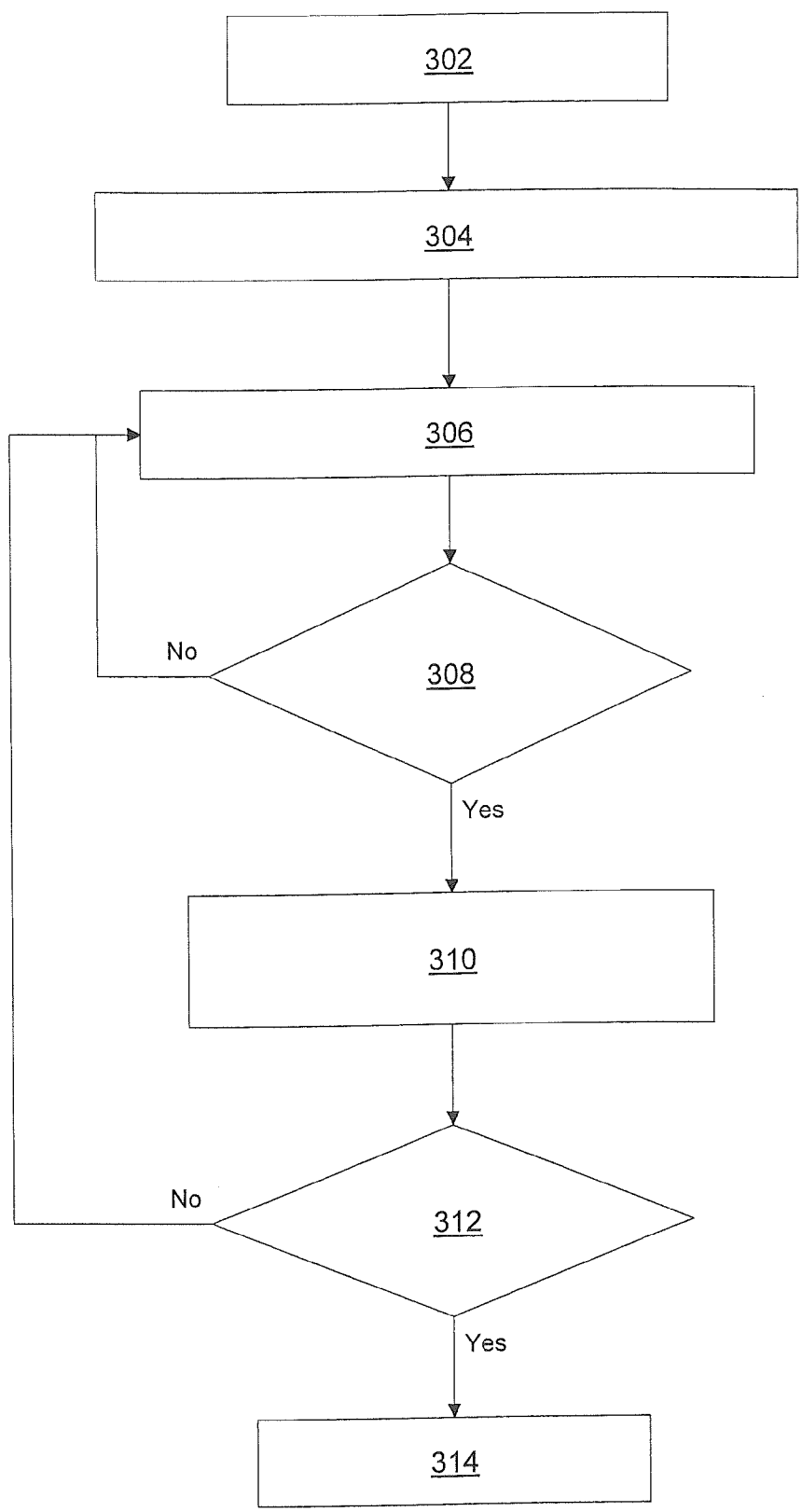
FIG. 3 is flow diagram describing a process for implementing customized vehicle services in accordance with an embodiment.

Turning now to FIG. 3, a flow diagram of a process for implementing customized vehicle services in accordance with an embodiment will now be described. The process begins at the initiation of a drive cycle at step 302. When an operator enters the vehicle and, optionally, powers on the vehicle, the drive cycle begins.

At step 304, the logic 104 accesses the memory 106 to retrieve the account settings. Simultaneously, at step 306, the logic 104 monitors the vehicle components 114, receives vehicle data 110, and logs the data and results of the monitoring in a log file of the memory 106. In an embodiment, the monitoring also includes identifying the current operator of the vehicle. This can be achieved in a number of different ways. As indicated above, this information can be directly provided by the operator, e.g., by entering a PIN via the user interface, or may be indirectly provided by entering the key fob into the ignition system. Alternatively, the operator identification may be established from processing the vehicle data 110, such as seat position settings, selected radio station, HVAC settings, time of day (e.g., where a particular operator drives to school at the same time each day), or GPS route (e.g., the operator drives the same route to the school each day).

Figure 4A:
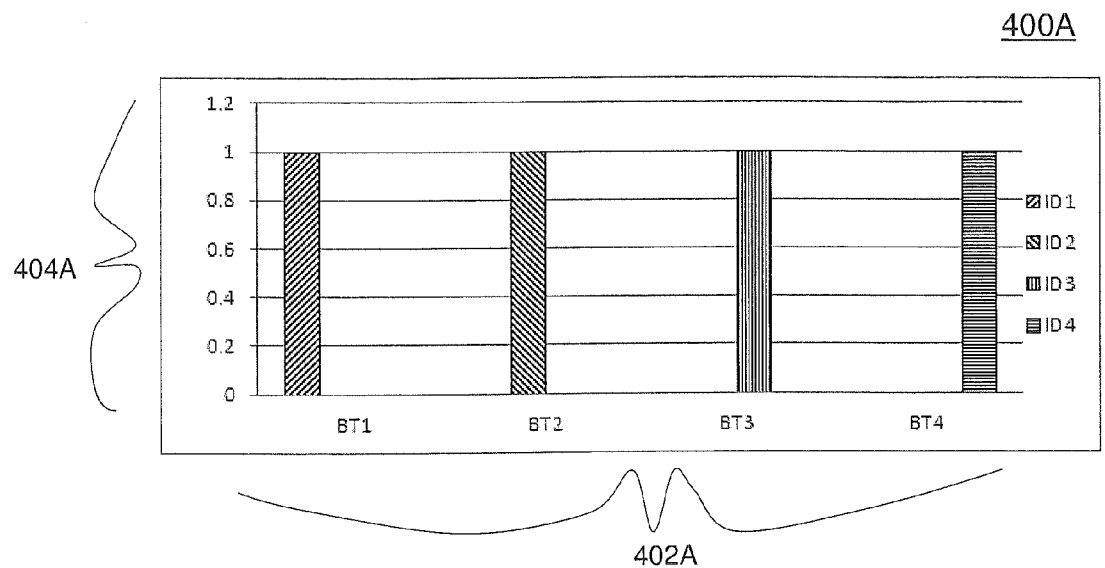
FIGS. 4A-4F are graphical diagrams depicting factors and sample data that are considered by the customized vehicle services in identifying a vehicle operator in accordance with an embodiment.

As shown in FIGS. 4A-4F, the logic 104 may process various information and patterns of behavior to ascertain with a certain level of confidence (level of probability) the identity of the current operator. For purposes of illustration, a chart 400A in FIG. 4A assumes there are four operators of a vehicle, each owning a Bluetooth™-enabled smart phone (represented in the Figure as a Bluetooth identifier (BT#) along an 'x' axis 402A). Along a 'y' axis 404A of the chart 400A, a probability indicator is shown. As illustrated in FIG. 4A, the probability of a smart phone identifier accurately identifying the operator is high.

Figure 4B:
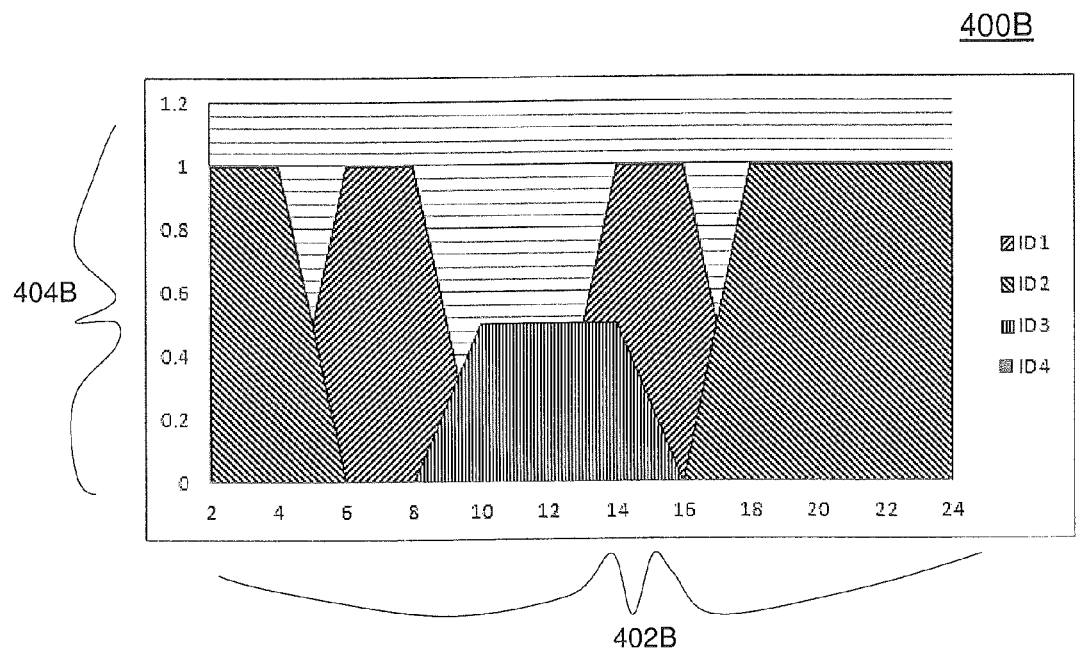
Figure 4C:
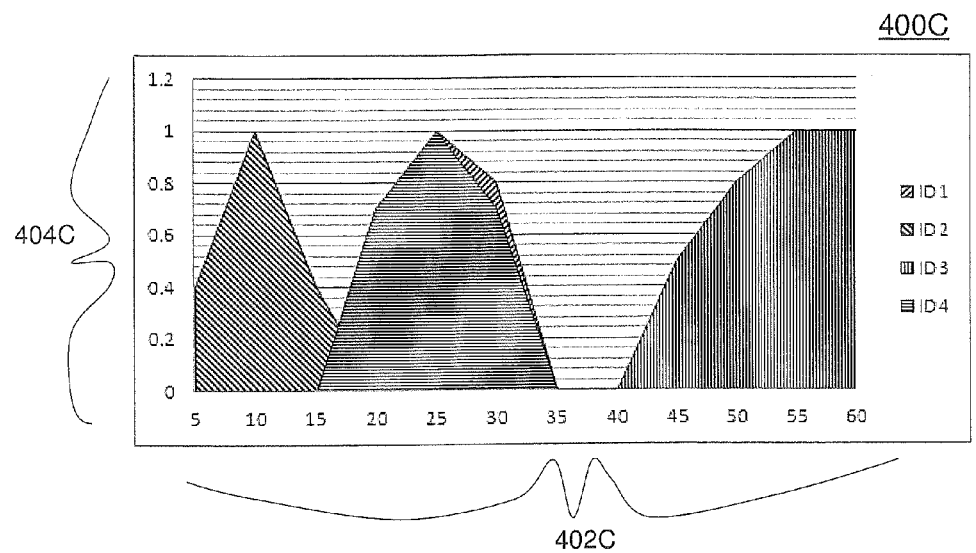
Figure 4D:
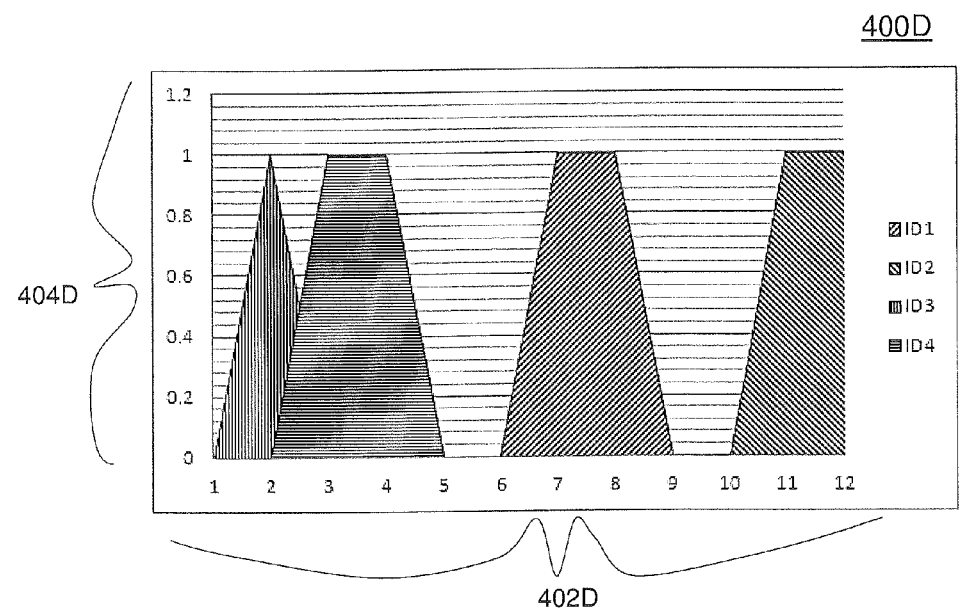
Figure 4E:
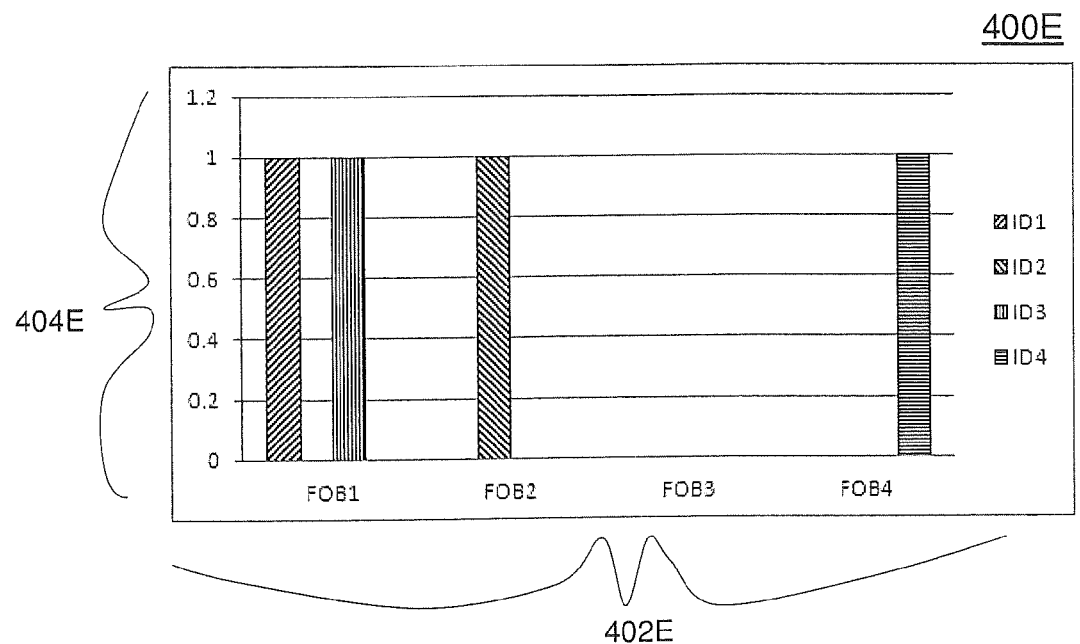
Figure 4F:
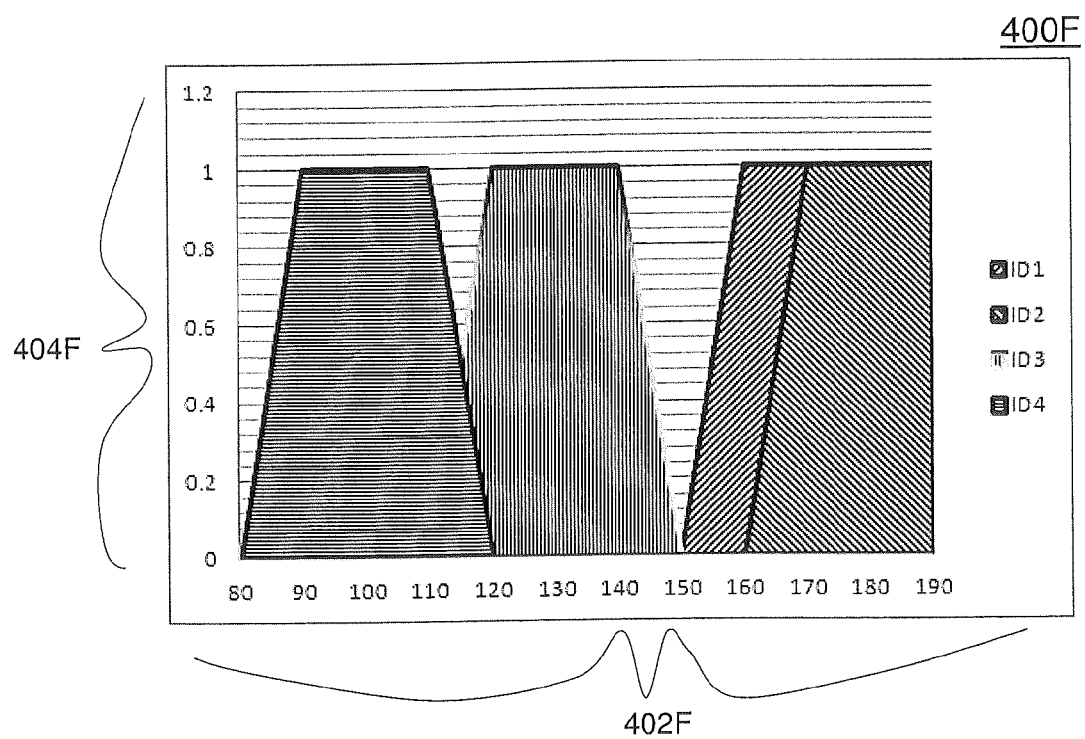

A chart 400B in FIG. 4B illustrates usage of the vehicle by the operators identified as ID1, ID2, ID3 and ID4 within a 24 hour period, whereby an 'x' axis 402B illustrates the 24-hour period, and a 'y' axis 404B illustrates the probability of accurately identifying a corresponding operator based on the time of day the vehicle was in operation.

A chart 400C illustrates an amount of time an operator takes to fasten a seat belt buckle, whereby an 'x' axis 402C illustrates a time range of 5 to 60 seconds, and a 'y' axis 404C illustrates the probability of accurately identifying a corresponding operator based on the time it takes the operator to fasten the seatbelt buckle. This analysis assumes that some operators generally take longer than others to fasten their seatbelts. Alternatively, some operators may be forgetful in fastening their seatbelts, and this lack of data can also be used, in combination with other data, to assist in identifying the operator as well.

A chart 400D illustrates seat positions used by the operators, whereby an 'x' axis 402D illustrates range of usable seat positions in the vehicle, and a 'y' axis 404D illustrates the probability of accurately identifying a corresponding operator based on seat positions used. Alternatively, some operators may not rely on seat positions when operating a vehicle and this lack of data can be used, in combination with other data, to assist in identifying the operator as well.

A chart 400E illustrates key fob identifiers associated with vehicle operators, whereby an 'x' axis 402E illustrates a key fob identifier (FOB1, FOB2, FOB3, and FOB4) for each of four operators of the vehicle, and a 'y' axis illustrates the probability of accurately identifying a corresponding operator based on the key fob identification. Similar to the smart phone identification described above, as shown in FIG. 4E, the probability of a key fob identifier accurately identifying the operator is high.

A chart 400F illustrates seat weight sensor data associated with vehicle operators, whereby an 'x' axis 402F illustrates a detected weight of each operator of the vehicle, and a 'y' axis 404F illustrates the probability of accurately identifying a corresponding operator based on the weight data.

The logic 104 may utilize a number of these data collection sources that have been logged into memory 106 by the logic 104 over time and used to identify each of the operators. Once the logic 104 has identified the operator, the logic 104 may be configured to confirm this identity by prompting the operator to confirm his/her identity to the system, e.g., via the input components of the I/O components 108.

Returning now to FIG. 3, the logic 104 determines whether a trigger condition exists at step 308. In one embodiment, a trigger condition exists when one operator has created a message for another operator to be presented when the other operator begins a drive cycle (an operator ID-based communication). The logic 104 accesses the file and determines whether a communication exists in the file for the operator ID. For example, the communication may be one that has been entered by another operator of the vehicle on a previous occasion and stored in the file. Alternatively, the communication may be a service reminder generated by the logic 104 based on the vehicle data 110 received at the control system 102 (e.g., an event condition).

If a trigger condition exists at step 308, the logic 104 executes an action corresponding to the condition and the user settings at step 310. For example, a trigger condition for an operator ID-based event may be a communication that exists in the file for the identified operator. The logic 104 presents the communication to the operator. The communication may be presented via the I/O components 108 of the vehicle (e.g., a vehicle display or monitor or audio system), or may be transmitted to a contact address or number provided by the operator or an individual that created the communication.

If the trigger condition relates to an emergency alert, the logic 104 may retrieve the emergency contact information specific to the operator in the vehicle from the account settings stored in the memory 106, and transmit an alert to individuals and/or facilities in the emergency contact list. The logic 104 may instruct the communications components 112, such as OnStar™ to call 9-1-1, and/or may enter a phone number via an in-vehicle cellular communication system, if present.

In a further embodiment, the customized vehicle services may be configured to perform other emergency-based actions, similar to an Amber Alert system. For example, an operator may pre-configure the account settings to perform a number of actions based on the occurrence of one or more events. In one scenario, as described above, the logic 104 may be configured to identify changes in a pattern of behavior typically associated with an operator. For example, suppose the operator has driven the vehicle to a location following a distinctly different route than is otherwise noted in the log for this operator. At a pre-defined elapsed time, the logic 104 may transmit a message to the operator requesting a confirmation reply (e.g., selecting a control button indicating he/she is okay). Alternatively, the logic 104 may be pre-configured to request a special passcode or unique button sequence indicating that the operator is still in control of the vehicle. If the operator does not respond to the prompt, or does not accurately respond to the prompt, the logic 104 may be configured to send an alert to authorities, e.g., through the vehicle's telematics system.

In a further embodiment, the logic 104 may be configured to activate various vehicle components 114 in an effort to draw attention to the vehicle (e.g., activating a pre-configured sequence of vehicle lighting components in which the lights flash on and off according to the sequence), activating the vehicle's horn or alarm system, and other components as desired. In one embodiment, the sequence of flashing lights may be configured using a Morse code-type method or a sequence that defines some standard that is understood by authorities as indicative of an emergency condition. The sequence may be configured to flash the lights of the vehicle in a clockwise or counter clockwise pattern. By providing these types of alerts and activities, vehicle operators are afforded some additional measure of safety and security, and these alerts and activities may thwart attempts by intruders to overtake operators of vehicles thereby preventing harm to vehicle occupants and theft of the vehicle.

Returning now to FIG. 3, if there is no triggering condition at step 308, the logic 104 continues to monitor events and log data at step 306. Once the action has been executed at step 310, the logic 104 determines if an exit condition exists at step 312. The logic 104 may monitor the activity state of the vehicle, e.g., whether it is powered on or off, since the event monitoring may no longer be required once the engine is off and/or the operator has exited the vehicle. If an exit condition exists (e.g., the operator has exited the vehicle), the drive cycle is determined to have ended at step 314.

If it is determined that an exit condition does not exist at step 314, the process returns to step 306, whereby the logic 104 continues to monitor the vehicle conditions.

Technical effects of the invention include customized vehicle services through recorded voice data and communications or other actions to be directed to individuals within a vehicle or to external sources based on user settings and monitored vehicle conditions and data. The communications include user-configured instructions or information directed to another operator of the vehicle that are presented over a communications medium selected by the user. The communications also include service or maintenance reminders to an operator of the vehicle. The communications further include alerts that are generated to targeted destinations based on emergency conditions.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system for implementing customized vehicle services, comprising:
    a vehicle control system including a computer processor; and
    logic executable by the computer processor, the logic configured to implement a method, the method comprising:
    receiving, from a first operator of a vehicle, user-selected settings for distributing a communication to a second and subsequent operator, the user-selected settings input to the computer processor by the first operator, and the user-selected settings including an identifier that uniquely identifies the second operator;
    receiving the communication generated by the first operator and storing the communication, the identifier of the first operator, and the identifier of the second operator in a memory device of the vehicle;
    collecting data with respect to a current driving event, the data relating to operator behavior with respect to use of vehicle components, identification of a wireless personal communication device in the vehicle, and identification of a key fob in the vehicle;
    comparing collected data from the current driving event with previously collected data that have been attributed to identifiers of other operators of the vehicle;
    determining a presence of the second operator when the collected data for the current driving event substantially matches a set of the previously collected data associated with the identifier;
    retrieving the communication from the memory device via the identifier of the second operator; and
    presenting the communication on a display device of the vehicle pursuant to the user-selected settings when the presence is determined.

2. The system of claim 1, wherein the user-selected settings further include emergency contact information and emergency alert information, the method further comprising:
    receiving a condition from the first operator, wherein an occurrence of the condition results in generation of a communication to an emergency contact specified in the emergency contact information, wherein the condition includes at least one of a roll-over incident and an airbag deployment with respect to the vehicle, and the communication includes the emergency alert information comprising at least one of a health condition and allergy condition.

3. The system of claim 1, wherein the collected data includes at least one of a selected radio station, seat position data, an amount of time used to connect a seatbelt, and an operator's weight received from a sensor connected to a seat of the vehicle.

4. The system of claim 1, wherein the user-selected settings include vehicle service criteria, the method further comprising:
    receiving a condition from the first operator, wherein an occurrence of the condition results in generation of a message instructing initiation of a vehicle service, the condition including a threshold value for a metric associated with at least one of the vehicle components.

5. The system of claim 1, wherein the communication is voice-recorded by the first operator and stored in a memory of the vehicle.

6. The system of claim 1, wherein the user-selected settings include a mobile application and device associated with the communication.

7. The system of claim 1, wherein the data relating to operator behavior with respect to use of vehicle components includes elements comprising a selected radio station, a selected seat position, an amount of time used to connect a seatbelt, a driving route, and a time of day of the current driving event, the method further comprising:
    associating a probability indicator to portions of the collected data from the current driving event, the probability indicator specifying varying levels of confidence in accurately identifying the second operator based on the corresponding vehicle components.

8. The system of claim 1, wherein the presenting the communication in the vehicle includes presenting the communication to the second operator at a time selected by the first operator via the user-selected settings.

9. The system of claim 1, wherein the user-selected settings include a user notification, and the data relating to operator behavior with respect to use of vehicle components includes a driving route, the method further comprising:
    comparing the driving route to a route pattern attributed to a current operator of the vehicle, the route pattern determined from the previously collected data; and
    upon determining a deviation of the driving route from the route pattern, transmitting the user notification according to the user-selected settings.

10. A method for implementing customized vehicle services, comprising:
    receiving, from a first operator of a vehicle, user-selected settings for distributing a communication to a second and subsequent operator, the user-selected settings input via a computer processor of a vehicle control system by the first operator of the vehicle, and the user-selected settings including an identifier that uniquely identifies the second operator;
    receiving the communication generated by the first operator and storing the communication, the identifier of the first operator, and the identifier of the second operator in a memory device of the vehicle collecting data with respect to a current driving event, the data relating to operator behavior with respect to use of vehicle components, identification of a wireless personal communication device in the vehicle, and identification of a key fob in the vehicle;

comparing collected data from the current driving event with previously collected data that have been attributed to identifiers of other operators of the vehicle;

determining a presence of the second operator when the collected data for the current driving event substantially matches a set of the previously collected data associated with the identifier;

retrieving the communication from the memory device via the identifier of the second operator; and presenting the communication on a display device of the vehicle pursuant to the user-selected settings when the presence is determined.

11. The method of claim 10, wherein the user-selected settings further include emergency contact information and emergency alert information, the method further comprising:

receiving a condition from the first operator, wherein an occurrence of the condition results in generation of a communication to an emergency contact specified in the emergency contact information, wherein the condition includes at least one of a roll-over incident and an airbag deployment with respect to the vehicle, and the communication includes the emergency alert information comprising at least one of a health condition and allergy condition.

12. The method of claim 10, wherein the collected data includes at least one of a selected radio station, seat position data, an amount of time used to connect a seatbelt, and an operator's weight received from a sensor connected to a seat of the vehicle.

13. The method of claim 10, wherein the user-selected settings include vehicle service criteria, the method further comprising:

receiving a condition from the first operator, wherein an occurrence of the condition results in generation of a message instructing initiation of a vehicle service, the condition including a threshold value for a metric associated with at least one of the vehicle components.

14. The method of claim 10, wherein the communication is voice-recorded by the first operator and stored in a memory of the vehicle.

15. A computer program product for implementing customized vehicle services, the computer program product comprising a non-transitory storage medium having computer program instructions embodied thereon, which when executed by a computer, cause the computer to implement a method, the method comprising:

receiving, from a first operator of a vehicle, user-selected settings for distributing a communication to a second and subsequent operator the user-selected settings input to the computer by the first operator of the vehicle, and the user-selected settings including an identifier that uniquely identifies the second operator;

receiving the communication generated by the first operator and storing the communication, the identifier of the first operator, and the identifier of the second operator in a memory device of the vehicle;

collecting data with respect to a current driving event, the data relating to operator behavior with respect to use of vehicle components, identification of a wireless personal communication device in the vehicle, and identification of a key fob in the vehicle;

comparing collected data from the current driving event with previously collected data that have been attributed to identifiers of other operators of the vehicle;

determining a presence of the second operator when the collected data for the current driving event substantially matches a set of the previously collected data associated with the identifier;

retrieving the communication from the memory device via the identifier of the second operator; and presenting the communication on a display device of the vehicle pursuant to the user-selected settings when the presence is determined.

16. The computer program product of claim 15, wherein the user-selected settings further include emergency contact information and emergency alert information, the method comprising:

receiving a condition from the first operator, wherein an occurrence of the condition results in generation of a communication to an emergency contact specified in the emergency contact information, wherein the condition includes at least one of a roll-over incident and an airbag deployment with respect to the vehicle, and the communication includes the emergency alert information comprising at least one of a health condition and allergy condition.

17. The computer program product of claim 15, wherein the collected data includes at least one of a selected radio station, seat position data, an amount of time used to connect a seatbelt, and an operator's weight received from a sensor of the vehicle.

18. The computer program product of claim 15, wherein the user-selected settings include vehicle service criteria, the method further comprising:

receiving a condition from the first operator, wherein an occurrence of the condition results in generation of a message instructing initiation of a vehicle service, the condition including a threshold value for a metric associated with at least one of the vehicle components.

19. The computer program product of claim 15, wherein the communication is voice-recorded by the first operator and stored in a memory of the vehicle.

20. The computer program product of claim 15, wherein the user-selected settings include a mobile application and device associated with the communication.

* * * * *